Patented Aug. 9, 1949

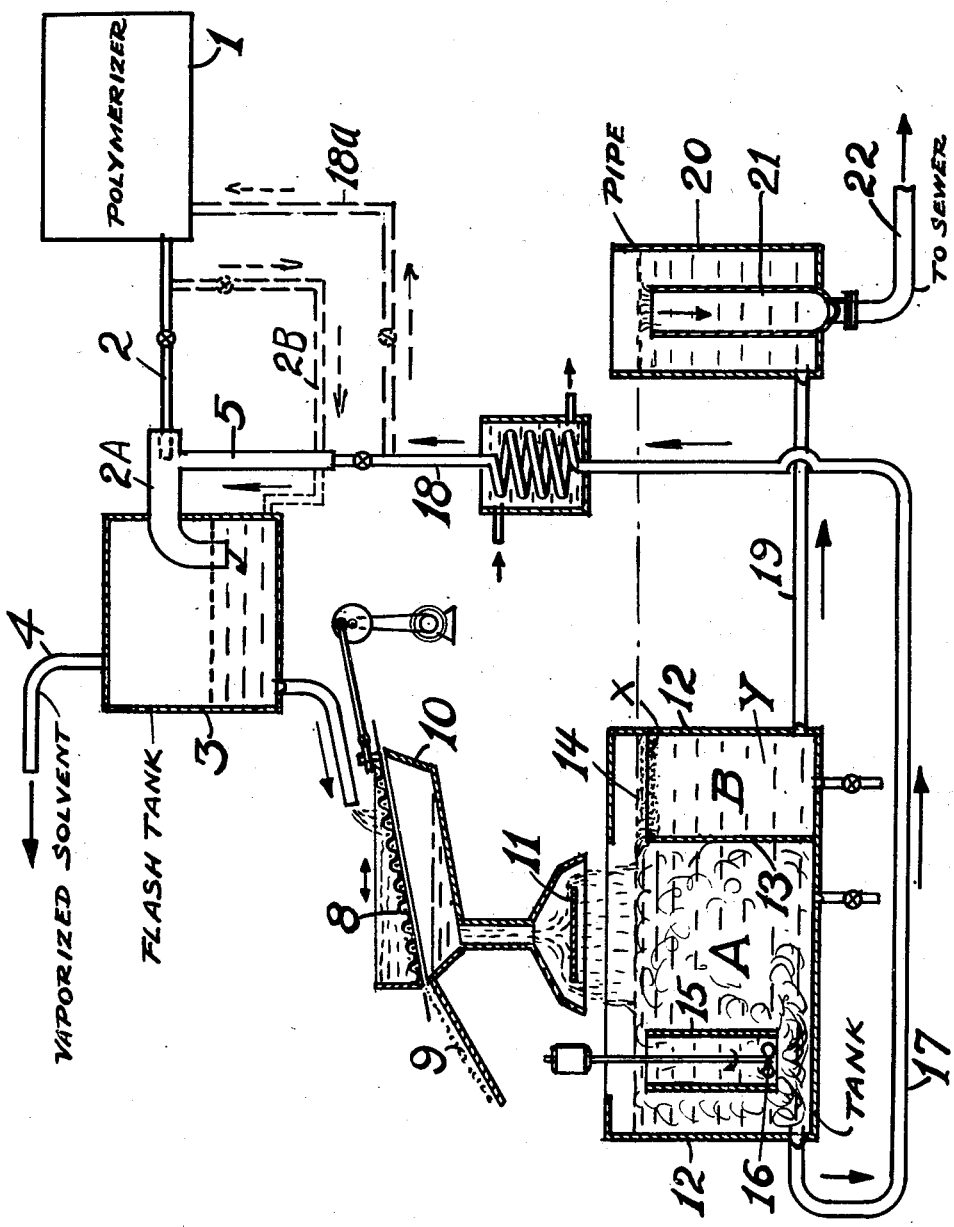

2,478,703

UNITED STATES PATENT OFFICE 2,478,703

RECOVERY OF RUBBERLIKE POLYMERS FROM PURGE WATER

Thomas Geddes Moore, Sarnia, Ontario, Canada, assignor to Standard Oil Development Company, a corporation of Delaware Application September 19, 1947, Serial No. 774,955

3 Claims. (Cl. 260—85.3)

The present invention relates to the recovery of rubber-like polymers and copolymers, and more specifically to a method for recovering such materials from purge waters of which a great deal is used in synthetic rubber manufacture. The invention will be fully understood from the following discussion and drawing.

The drawing is a diagrammatic view of the vertical elevation of an apparatus illustrating the method for handling purge water containing small amounts of polymeric materials and indicates the flow of the materials in process.

In the various processes for making synthetic rubber-like polymers and copolymers there is a large volume of purge water employed. Normally, it contains a small amount of solids, chiefly the rubbery polymers or copolymers with more or less zinc stearate or other fillers. Since this polymer is present in small particle sizes, it is not easily separable and is discarded with the purge water unless great care is taken with its recovery. Not only is there a saving in the value of the material lost in this manner, but in addition the discarded rubber will form troublesome deposits in sewers and other pipes so as to make a sufficient justification in itself for the need of the process.

Referring to the drawing, the numeral 1 designates the polymerizing apparatus. It is shown generally as a solid block, but it will be understood that it represents a polymerizing vessel of any one of the various types. As an example, it may represent the polymerizing operation at low temperatures in which an olefin such as isobutene is polymerized or copolymerized with a suitable diolefin, such as isoprene or butadiene at temperatures below —20° F. and preferably of the order of —150° F. in an inert organic medium such as an alkyl chloride or carbon disulfide. Friedel-Crafts catalysts are employed as in U. S. 2,356,128. As another example of a process in which the present invention may be useful, we may refer to copolymerizations in which the reactants are present as an aqueous emulsion, the reactants being styrene or acrylic nitrile either of which may be copolymerized with a diolefin such as butadiene at a temperature from say 90 to 150° F. using an oxidation catalyst such as organic peroxide or a persulfate as in U. S. 1,973,000 and U. S. 2,281,613.

Referring again to the drawing, pipe 2 is used to conduct the reaction liquor from the reactor for the subsequent recovery. In the case of the low temperature process, referred to as the first example given above, the first step in the process is to raise the temperature to the boiling point of the inert solvent and to accomplish this the reaction liquor is discharged through a nozzle 2A and thoroughly admixed with hot water fed by pipe 5. This mixture is discharged into a flash tank 3, from which the solvent vaporizes and is removed by a pipe 4. An aqueous suspension of the polymer is formed as a liquid layer. In the emulsion type of polymerization it is not necessary to raise the temperature and since the organic solvent is not employed, the reaction liquor may be discharged directly from the polymerizer 1 into the tank 3 by line 2B.

In either case the aqueous portion of the polymerization product is discharged directly on to a vibrating screen or filter indicated at 8 and the solid rubbery material so separated is removed at 9. This material is subsequently plasticized, dried and packaged and need not be dealt with further here, as its treatment forms no part of the present invention.

The water passing through the filter or screen 8 is collected in a pan 10 from which it is discharged over a distributing plate or similar deflector 11 into a large tank 12.

This water, while freed of the larger sized polymer particles, still contains polymers or copolymers of small particle sizes which cannot be separated by the filter or screen and it is the object of the present invention to recover this material.

The tank 12 is large in volume and is divided into two portions by a vertical partition 13. The two portions are indicated by A and B. The level of the liquor held in the tank is indicated at 14 and it is to be noted that liquid level is only two to three inches above the top of the partition wall 13 so that the two portions of the tank, A and B, are in communication only at the surface layer. In the tank compartment A there is a vertical draft tube 15, in the lower part of which is placed a propeller stirrer 16 which is capable of keeping the material in the compartment A in a state of thorough agitation. Liquid containing the solid particles is drawn off from the lower part of this compartment by pipe 17 and is returned to a prior stage of the process, for example, by line 18 to the flash tank by pipe 5, as indicated before, or in the case of the emulsion type polymerization directly to the polymerization vessel by the alternate line 18A.

While the contents of the compartment A are kept in a state of substantial homogeneity by agitation, compartment B is unagitated and is in a quiescent state, permitting the separation of the small particles of polymer as an upper layer $x$ and a lower layer $y$ of water relatively free of polymer particles. This lower layer is withdrawn by a pipe 19 and is discharged into an upright vertical pipe 20. Within this pipe there is a coaxial pipe 21 which is placed with its upper end so as to maintain the desired level in the tank 12 and acts as a weir over which the water from pipe 20 flows into the pipe 21 and is thus discarded to the sewer by a pipe 22.

In order to more fully understand the operation of the present process, it should be understood that the greater part of the rubber particles in the aqueous slurry is readily separable from the aqueous liquid and that these particles have an average diameter greater than about .02 to .03 inch, which size can be readily handled by a screen or filter but there is always a small amount of say ½ to 2% of the rubber having a size below the above which cannot be so separated by a filter or screen, and this is the material which eventually fouls sewers or other equipment. It has been found that if these small size materials are caused to pass and recirculate again through the apparatus, they will eventually agglomerate to larger sizes and they can be recovered by the screen or filter. It has also been found that the use of the tank 12 separated into agitated and unagitated compartments furnishes an easy and efficient method by which the small size particles can be separated and recirculated to the process while the larger particles are withdrawn. The quiescent compartment B is of such dimensions that the smaller rubber particles will segregate in an upper layer to an extent of 95 to 99% of the amount present.

In order to effect such a separation the volume of the compartment B should be at least at 25% of the volume of compartment A and at least 350% of the volume of water handled per minute and that the vertical height of the draw-off pipe 21 and the upper layer should be at least 5 feet. The tank 12 may, of course, be separated into two separate tanks, but they should be connected as shown at their upper surface, that is, the upper layers are in connection. Agitation in tank compartment A is sufficient to produce a sufficiently violent mixing in that compartment to keep the contents homogeneous, and also a gentle swirling of the upper layer of the entire tank so that the rubber particles rising to the upper layer of compartment B are carried over the partition to the compartment A. The agitation is not sufficient to communicate itself to the lower portions of the compartment B and the segregation of the aqueous layer is readily and easily accomplished.

In the above operation it will be noted that the action depends on the flow of the creamed polymer layer in B to the tank compartment A and this is accomplished by natural flow caused by the agitation of tank A. This may be augmented by the use of a suitable stream of water directed at the surface layer so as to cause a positive circulation from one compartment to the other.

This invention is not to be limited to any theory of the operation but only to the following claims.

I claim:

1. In a process for recovering small particles of rubber polymers having a specific gravity less than 1 and a diameter of less than about .02–.03 inch contained in process water purged in the manufacture of synthetic rubber, the improvement which comprises maintaining the process water in a series of two pools, said pools being in communication only at the surface layer, the volume of the second pool being at least 25% of the volume of the first pool; maintaining the first pool in an agitated state; maintaining the second pool in a quiescent state, withdrawing polymer enriched slurry from the first pool, and withdrawing and discarding water free of the small rubber polymer particles from the second pool.

2. In a process for making synthetic rubber-like polymers from isobutene and isoprene wherein an aqueous process water slurry containing particles of rubbery polymers having a specific gravity of less than 1 are obtained, the improvement which comprises the steps of screening said aqueous slurry to separate therefrom the particles having a diameter greater than about .02–.03 inch; discharging the residual aqueous slurry containing smaller polymer particles having a diameter of less than about .02–.03 inch into an agitated zone and a quiescent zone, said zones being in communication only at the surface whereby the smaller polymer particles are segregated in an upper portion of the quiescent zone and carried over to the agitated zone; withdrawing the water free of the smaller particles from the quiescent zone and withdrawing polymer enriched slurry from the agitated zone.

3. A process as in claim 2 including the additional step of recycling the polymer enriched slurry from the agitated zone to the synthetic rubber proceess at a point prior to the screening step.

THOMAS GEDDES MOORE.

REFERENCES CITED

The following references are of record in the file of this patent:

UNITED STATES PATENTS

| Number | Name | Date |
|---|---|---|
| 2,410,633 | Counselman | Nov. 5, 1946 |